June 25, 1957 A. J. CARPENTER 2,796,767
DRILL HEAD SPINDLE DRIVE CONSTRUCTION
Filed March 15, 1955 5 Sheets-Sheet 1

FIG.1

INVENTOR.
ALBERT J. CARPENTER
BY
Frease & Bishop
ATTORNEYS

June 25, 1957   A. J. CARPENTER   2,796,767
DRILL HEAD SPINDLE DRIVE CONSTRUCTION
Filed March 15, 1955   5 Sheets-Sheet 2

FIG.2

INVENTOR.
ALBERT J. CARPENTER
BY Frease & Bishop
ATTORNEYS

June 25, 1957   A. J. CARPENTER   2,796,767
DRILL HEAD SPINDLE DRIVE CONSTRUCTION
Filed March 15, 1955   5 Sheets-Sheet 3

FIG.3

INVENTOR.
ALBERT J. CARPENTER
BY Frease & Bishop
ATTORNEYS

United States Patent Office 2,796,767
Patented June 25, 1957

2,796,767

DRILL HEAD SPINDLE DRIVE CONSTRUCTION

Albert J. Carpenter, Canton, Ohio, assignor to The Cleveland Tapping Machine Company, Canton, Ohio, a corporation of Ohio Application March 15, 1955, Serial No. 494,403

25 Claims. (Cl. 74—22)

My invention relates to improvements in drill head spindle drive construction and more specifically to a mechanical drill head spindle drive in which the rate of feed is readily adjustable for use with various materials and various tools.

Some prior types of mechanical drill head spindle drives have incorporated cams to feed the drilling unit to and from the workpiece for the drilling operation. These constructions have included a main drill head housing unit in which the drill spindle is rotatably mounted. This main housing unit has been reciprocably mounted on stationary members and thus reciprocation of the main housing unit and consequently the drill spindle and drill has been accomplished by using various constructions of the cam drives.

One of the principal difficulties of this type of drill head construction has been that the feed rate of the drill spindle is fixed in the original construction and cannot be changed except by a complete replacement of the cams. This obviously results in high maintenance costs and considerable lost time in production. An additional difficulty is that the entire main housing is reciprocated during the feed and return strokes of the drill spindle and consequently a great amount of power is required to accomplish this reciprocation.

A further difficulty with this type of construction is that it is expensive to initially fabricate and expensive to maintain where varied rates of feed are required. These conditions are present because of the heavy construction necessary to accomplish a reciprocation of the entire main drill head housing and the requirement of replacing the cam drives every time it is necessary to change the rate of feed.

Another type of prior mechanical drill head spindle drive construction has used a screw and nut arrangement mounted exterior of the drill spindle unit to drive the entire drill spindle housing for the feed stroke. In this case, the drill spindle is again rotatably mounted in a main drill spindle housing with the entire main housing being reciprocated on a stationary stand by this screw and nut arrangement. In this type of construction a separate drive motor is connected to each the screw and nut in order to obtain varying speeds between the screw and nut and thus provide a fast feed, slow feed, and fast return stroke.

One of the main difficulties with this type of prior construction is that very close clutch and switch timing is required to accomplish the various feed and return strokes. Thus a complicated and expensive electrical system as well as clutching system is required. Additionally, an excessive amount of power is again required to drive this unit since again the entire drill spindle housing is reciprocated.

A further difficulty with this type of unit is that once the fast and slow feed rates and the fast return rate are set, it is necessary to completely change the gears or the drive motors in order to change the rates of these various feed and return strokes. Additionally, this type of prior drill head spindle drive construction has been expensive and complicated requiring high initial fabricating expenditure and high maintenance expenditure.

Still another type of prior drill head spindle drive construction has used hydraulic means to accomplish the feed and return stroke. In this case, the drill spindle is fed towards the workpiece and returned by use of a hydraulic ram.

One of the principal difficulties with this type of hydraulic feed construction is that it is necessary to run this unit for a period of time in order to warm it up so that constant feeds may be obtained. Further, it is difficult to construct such a hydraulic unit that will give a closely constant fast and slow feed stroke even after it has completed such a warm-up period. Additionally, the rates of the feed strokes will vary depending on the softness of the metal to be drilled and also on the sharpness and design of the drilling tool. And finally, these hydraulic units are expensive to initially fabricate and expensive to maintain.

It is therefore a general object of the present invention to provide a drill head spindle drive construction which eliminates these stated and other difficulties of these prior constructions.

It is a primary object of the present invention to provide a drill head spindle drive construction in which the rate of feed may be quickly and easily adjusted for various materials and various tools.

It is another object of the present invention to provide a drill head spindle drive construction in which the rates of feed remain constant and uniform once set.

It is still another object of the present invention to provide a drill head spindle drive construction in which the rates of feed may be quickly varied without the necessity of changing gears or cams.

It is further object of the present invention to provide a drill head spindle drive construction which does not require a warm up period in order to obtain constant feed rates.

It is still a further object of the present invention to provide a drill head spindle drive construction in which the drill head housing remains stationary and a quill which directly houses the drill spindle is fed towards and away from the work.

Additionally, it is an object of the present invention to provide a drill head spindle drive construction in which the feed screw and nut are mounted directly around the drill spindle with one being driven from either side giving a balanced drive for the feed strokes to the quill and spindle.

Finally, it is an object of the present invention to provide a drill head spindle drive construction in which there is no close timing required in order to attain the fast approach stroke, slow feed stroke and the fast return stroke of the quill and spindle.

These and other objects are accomplished by the parts, constructions, arrangements, combinations and sub-combinations comprising the present invention, the nature of which is set forth in the following general statement, a preferred embodiment of which—illustrative of the best mode of which applicant has contemplated applying the principles—is set forth in the following description and illustrated in the accompanying drawings, and which is particularly and distinctly pointed out and set forth in the appended claims forming a part hereof.

In general terms, the improved drill head spindle drive construction constituting the present invention may be stated as including a constantly rotatable spindle, a screw rotatably mounted on the spindle, a nut rotatably mounted surrounding and engaged with the screw, means securing the spindle and the screw against longitudinal movement in relation to each other, means driving the spindle, means selectively driving the screw, and means selectively driving the nut.

More specifically, the improved drill head spindle drive construction constituting the present invention may be stated as including a constantly rotatable spindle having a splined upper portion, a quill surrounding the lower portion of the spindle, first bearing means mounted between the lower portion of the spindle and the quill, a screw rotatably mounted on the central portion of the spindle, second bearing means mounted between the screw and the quill, means securing the screw, spindle and quill against longitudinal movement in relation to each other, a driven screw gear mounted on the screw, a screw drive shaft, a differential driving gear mounted on the screw drive shaft and engaged with the driven screw gear, a screw drive shaft clutch connected to the screw drive shaft and holding the screw drive shaft against rotation when disengaged, a nut rotatably mounted surrounding and engaged with the screw, a nut driven gear mounted on the nut, a nut driving shaft, a nut driving gear mounted on the nut driving shaft and engaged with the nut driven gear, a nut drive shaft clutch connected to the nut drive shaft and holding the nut drive shaft against rotation when disengaged, a spindle driving gear engaged with the splined upper portion of the spindle, drive means connected to the spindle driving gear and the screw drive shaft clutch and the nut drive shaft clutch, and control means controlling the engagement and disengagement of the screw drive shaft clutch and the nut drive shaft clutch.

By way of example, an embodiment of the drill head spindle drive construction of the present invention is illustrated in the accompanying drawings forming a part hereof wherein like numerals indicate similar parts throughout the several views and in which.

The drill head spindle drive construction comprising the present invention includes a main housing member generally indicated at 1, a spindle and quill assembly generally indicated at 2, a lead screw assembly generally indicated at 3, a nut assembly generally indicated at 4, a cam and clutch control assembly generally indicated at 5, and a main drive assembly generally indicated at 6. The main housing member 1 is preferably cast iron and contains appropriate openings and mounting surfaces for mounting the various assemblies that comprise the drill head spindle drive assembly.

Figure 1:
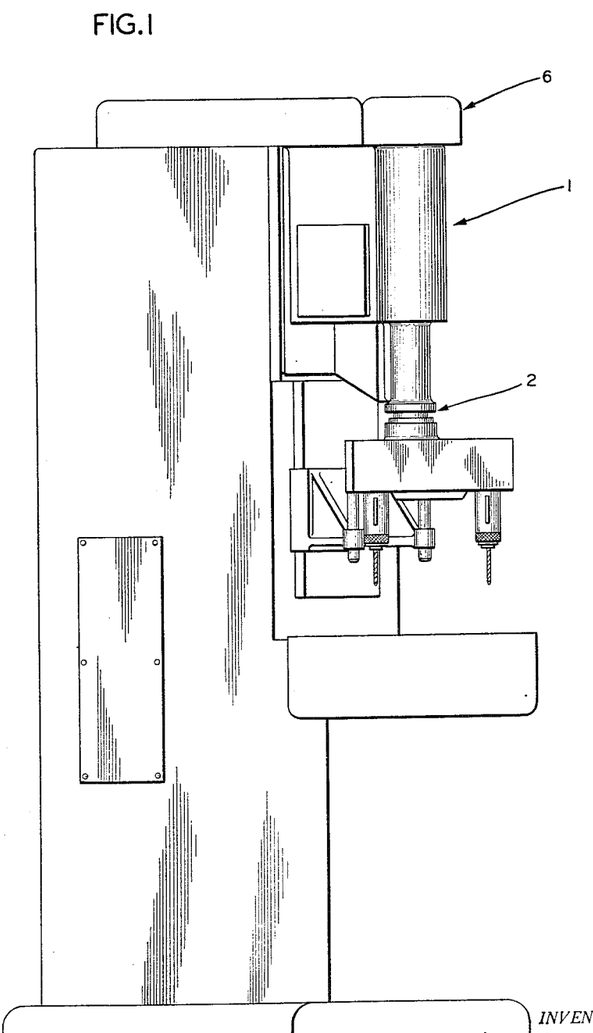
Fig. 1 is a side plan view of a drilling unit incorporating the drill head unit of the present invention.
Figure 2:
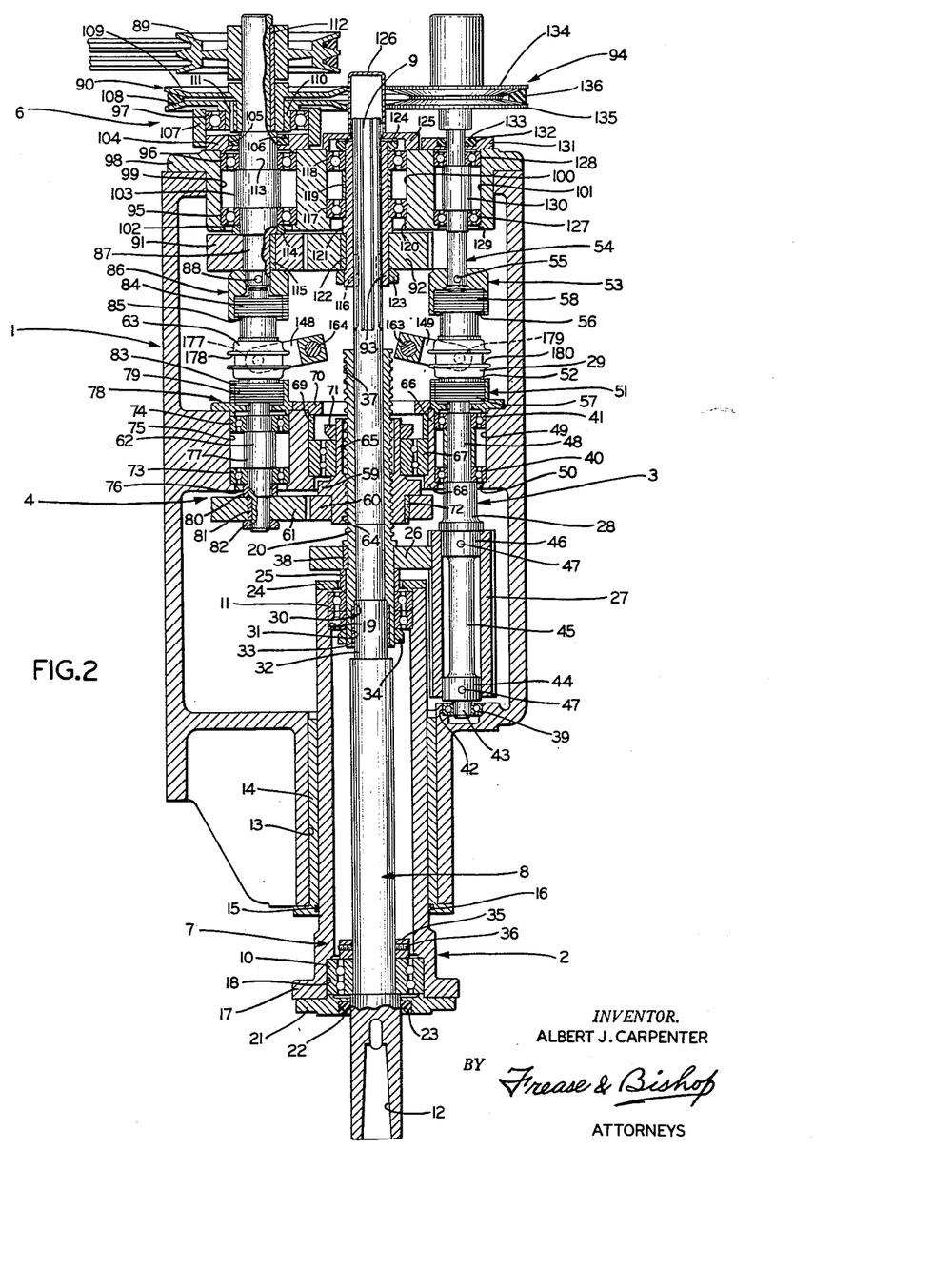
Fig. 2, a longitudinal sectional view of the drill head unit in the "at rest" position.

The spindle and quill assembly 2 includes a quill generally indicated at 7 and a spindle generally indicated at 8. Referring to Fig. 2, the spindle 8 is circular in cross section and has a spline 9 formed at its uppermost end. The spindle 8 is rotatably mounted in the quill 7 by means of preferably ball bearings 10 and 11 and extends from the lower end of the quill 7. In the extending portion of the spindle 8, a Morse taper 12 is formed for reception of drilling tools (not shown) or a multiple spindle drilling head (not shown).

A sleeve 13 is formed in the lower portion of the main housing member 1 and the quill 7 is mounted within this sleeve 13. A quill bushing 14 is mounted in the sleeve 13 surrounding the quill 7 so that the quill 7 is longitudinally reciprocal in the main housing member 1. At the lowermost end of the quill bushing 14, as viewed in Fig. 2, on its inside diameter surface, a recess 15 is formed in which recess is mounted a standard O ring 16.

The quill 7 is generally a hollow cylinder having a flange portion 17 at its lowermost end and having the spindle 8 telescoped centrally within this hollow cylinder. Recess 18 is formed on the inner surface of the quill 7 near its lowermost end and the bearing 10 is mounted in this recess 18 surrounding the spindle 8 by preferably a press fit.

On the inner surfaces of the upper end of the quill 7 a similar recess 19 is formed in which is received the bearing 11 which surrounds the lead screw 20 of the lead screw assembly 3 also by preferably a press fit. The lead screw 20 is in turn rotatably mounted surrounding the spindle 8. Bearings 10 and 11 are preferably duplex ball bearings.

The retaining ring 21 is mounted on the flange portion 17 of the quill 7, and retains the ball bearing 10 in the recess 18 and also surrounds the lower end of the spindle 8. A recess 22 is formed on the inner diameter of the retaining ring 21 and an oil seal 23 is received in this recess 22 and prevents any oil from passing between the quill 7 and the spindle 8.

A retaining ring 24 is mounted abutting the uppermost end of the quill 7 and retains the bearing 11 in the recess 19. The retaining ring 24 surrounds and is spaced from a spacer 25 which in turn surrounds the lead screw 20 between the bearing 11 and the lead screw driven gear 26.

The lead screw assembly 3 includes the lead screw 20, the lead screw driven gear 26, lead screw differential driving gear 27, a lead screw drive shaft 28 and a lead screw drive shaft clutch member 29.

The lead screw 20 is mounted surrounding the spindle 8 and is a generally hollow cylinder. The lead screw 20 has a recess 30 formed in its inner surface near its lowermost end and a recess 31 extending from the recess 30 to the lowermost end of the lead screw 20. The offset 32 on the spindle 8 is received in the recess 30 and extends below the lowermost end of the lead screw 20. A bushing 33 is received in the recess 31 of the lead screw 20 and surrounds the spindle 8 at the offset 32.

A lock nut 34 is mounted surrounding and preferably threaded on the lower end of the lead screw 20 and abuts the lower end of the bearing 11. A lock ring 35 is mounted surrounding and abutting the spindle 8 near the lower end of the spindle 8. Lock ring 35 also abuts the upper side of the bearing 10 and is fixedly mounted on the spindle 8 by preferably set screws 36.

Thus, the offset 32 of the spindle 8 received in the recess 30 formed in the inner surface of the lead screw 20, the lock nut 34 mounted on the outer surface of the lead screw 20 abutting the lower end of the bearing 11 and the lock ring 35 mounted surrounding the spindle 8 and abutting the upper end of the bearing 10 prevent any longitudinal movement between the lead screw 20, the spindle 8 and the quill 7. In other words, even though the spindle 8 is rotatably mounted in reference to the quill 7 and the lead screw 20, and the lead screw 20 is rotatably mounted in reference to the quill 7 and the spindle 8, if one moves longitudinally, they all must move longitudinally.

A threaded portion 37 is formed on the outer surface of the lead screw 20 from the uppermost end of the lead screw 20 for the major portion of its length. The lead screw driven gear 26 is fixedly mounted surrounding the lead screw 20 adjacent the lower end of the threaded portion 37 and abutting the upper end of the spacer 25. The key 38 solidly connects the lead screw driven gear 26 to the lead screw 20 for driving connection therebetween.

The lead screw drive shaft 28 is rotatably mounted in the main housing 1 parallel and spaced from the spindle 8 and the lead screw 20 by means of preferably ball bearings 39, 40 and 41. The drive shaft 28 is generally circular in cross section and is formed of various diameters at various points for purposes to be hereinafter described.

The bearing 39 is mounted in the recess 42 formed in the main housing 1 and the lowermost end 43 of the drive shaft 28 is of reduced diameter and is mounted in the bearing 39. Adjacent and above the reduced diameter portion 43, the drive shaft 28 is formed into an enlarged portion 44, a reduced portion 45 and another enlarged portion 46.

The lead screw differential driving gear 27 is mounted surrounding the lower portion of the drive shaft 28 so that is is engaged over the enlarged portions 44 and 46 and spans and is spaced from the reduced portion 45, and also so that it is in driving engagement with the lead screw driven gear 26, as shown in Fig. 2. The drive shaft 28 and the differential driving gear 27 are solidly connected in driving connection by means of the pins 47 which engage the drive shaft 28 at the enlarged portions 44 and 46.

The drive shaft 28 is formed into another reduced portion 48 near its uppermost end and this reduced portion 48 is received in the bearings 40 and 41. The bearings 40 and 41 are mounted in spaced relationship in a sleeve 49 formed in the main housing 1, as shown in Fig. 2. The sleeve 49 contains an offset portion 50 at its lower end and the lower surface of the bearing 40 abuts the upper end of this offset 50.

Lead screw brake cup member 51 is partially received in the upper end of the sleeve 49 of the main housing 1 by preferably a press fit to solidly mount it therein. The lower end of the brake cup member 51 serves as a retaining ring abutting the upper surface of the bearing 41, and the upper portion of the brake cup member 51 is formed into a brake cup 52. A similarly formed drive cup member 53 is mounted on the lower end of the differential drive shaft 54 by means of the pin 55 and the drive cup member 53 similarly includes a drive cup portion 56.

The lead screw drive shaft clutch member 29 is mounted between the brake cup member 51 and the drive cup member 53 so that the lower end 57 of the clutch member is received in the cup portion 52 and the upper end 58 of the clutch member is received in cup portion 56, as shown in Fig. 2. The lower end 57 of the drive shaft clutch member 29 is solidly mounted to the lead screw drive shaft 28 so that there is driving connection therebetween, while the upper end 58 of the clutch member 29 is spaced from the lowermost end of differential drive shaft 54 so that the only time there is driving connection between the clutch member 29 and the differential drive shaft 54 is when the upper end 58 of the clutch member 29 is engaged with the drive cup member 53.

The clutch member 29 is constructed so that when it is in its lowermost position as shown in Fig. 2, the lower end 57 is engaged with the brake cup 52. Thus, since the lower end 57 is solidly connected to the lead screw drive shaft 28, it retains the drive shaft 28 against rotation. At the same time, when the clutch member 29 is in this lower position, the upper end 58 is disengaged from the drive cup 56, so that no rotational motion is transmitted from the differential drive shaft 54 to the clutch member 29.

Figure 3:
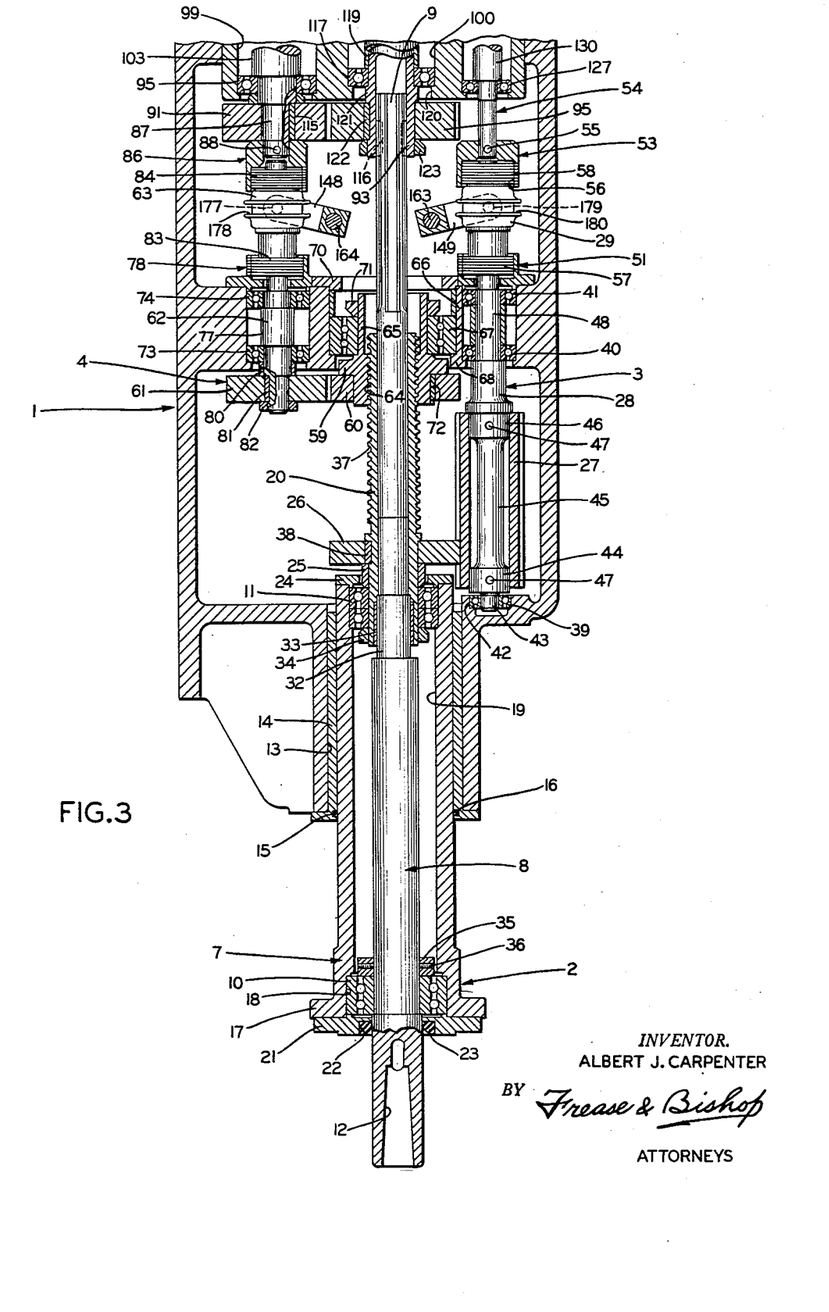
Fig. 3, a fragmentary longitudinal sectional view of the drill head unit during the "slow feed" cycle.

Further, the clutch member 29 is constructed so that when it is in its upper position as shown in Fig. 3, the upper end 58 is in driving engagement with the drive cup 56. Thus, rotational motion is transmitted from the differential drive shaft 54 to the clutch member 29 and consequently to the lead screw drive shaft 28. At the same time, the lower end 57 of the clutch member 29 is disengaged from the brake cup 52 so that free rotational motion of the lead screw drive shaft 28 is permitted.

The nut assembly 4 includes a nut 59, a nut driven gear 60, a nut driving gear 61, a nut drive shaft 62, and a nut drive shaft clutch member 63.

The nut 59 is generally a hollow cylinder and has a threaded portion 64 formed in the lower portion of its bore. The upper portion 65 of the nut bore is formed of a larger diameter than the outside diameter of the threaded portion 37 of the lead screw 20 so that the upper portion 65 is slightly spaced from the outer diameter of the lead screw 20, as shown in Fig. 2. The threaded portion 64 of the nut 59 is engaged with the threaded portion 37 of the lead screw 20.

A sleeve 66 is formed in the main housing 1 and the nut bearing 67 is received in this sleeve 66 surrounding and engaged with the nut 59, as shown. The lower surface of the bearing 67 abuts an offset portion 68 formed in the lower portion of the sleeve 66 and at its upper surface abuts the spacer 69 which is received in the sleeve 66 above the bearing 67.

A retaining ring 70 is partially received in the sleeve 66 which retaining ring abuts the upper end of the spacer ring 69. A lock nut 71 is preferably threaded to the outer surface of the nut 59 at its upper end so that the lock nut 71 abuts the top of the bearing 67, as shown in Fig. 2.

Thus, the bearing 67 is retained against longitudinal movement in the sleeve 66 by the spacer ring 69 and the retaining ring 70 and the nut 59 is retained against longitudinal movement in the bearing 67 by the lock nut 71 so that the nut 59 is movable rotatably, but not longitudinally.

The nut driven gear 60 is fixedly mounted surrounding the lower end of the nut 69 and this fixed connection is obtained by the key 72. Gear 60 is also mounted in lateral alignment with and in engagement with the nut driving gear 61.

The nut drive shaft 62 is journaled to the main housing 1 by means of the preferably ball bearings 73 and 74 which are received in the sleeve 75 in the main housing 1. The lower surface of the bearing 73 abuts an offset 76 formed in the sleeve 75 and an enlarged portion 77 of the nut drive shaft 62 abuts the top of the bearing 73.

This enlarged portion 77 of the nut drive shaft 62 also abuts the lower edge of the bearing 74 and the top edge of the bearing 74 is abutted by the brake cup member 78. Brake cup member 78 is partially received in the sleeve 75 and thus serves as a retaining ring for the bearing 74. Brake cup 79 is formed in the upper portion of brake cup member 78.

A spacer ring 80 surrounds the nut drive shaft 62 abutting the lower edge of the bearing 73 and the driving gear 61 is fixedly mounted on the nut driving shaft 62 abutting the lower edge of the retaining ring 80. Driving connection between the driving gear 61 and the drive shaft 62 is obtained by the key 81. The drive gear 61 is mounted engaged with the driven gear 60 and is retained in place on the end of the drive shaft 62 abutting the retaining ring 80 by the lock nut 82. The lock nut 82 abuts the lower surface of the driving gear 61 and is preferably threaded to the lower end of the drive shaft 62.

The clutch arrangement in the nut assembly 4 is similar to that in the lead screw assembly 3 so that the lower end 83 of the clutch member 63 is received in the brake cup 79 and is solidly connected to the drive shaft 62, while the upper end 84 of the clutch member 63 is received in the drive cup 85 in the drive cup member 86. The drive cup member 86 is mounted on the main drive shaft 87 and is fixedly connected thereto by means of a pin 88.

Thus, as in the lead screw assembly 3, when the clutch member 63 is at its lower position, as shown in Fig. 2, the lower end 83 is engaged with the brake cup 79 preventing rotational movement of the nut drive shaft 62. At the same time, the upper end 84 is disengaged from the drive cup 85 so that no rotational movement is transmitted from the main drive shaft 87 to the clutch member 63.

Also as in the lead screw assembly 3, when the clutch member 63 is in its upper position, as shown in Fig. 3, the lower end 83 is disengaged from the brake cup 79 so that the nut drive shaft 62 is freely rotatable. At the same time, the upper end 84 is engaged with the drive cup 85 so that rotational motion is transmitted from the main drive shaft 87 to the clutch member 63 and consequently to the nut drive shaft 62.

The main drive assembly 6 includes the main drive shaft 87, a motor driven pulley 89, a variable speed differential drive pulley 90, a spindle drive gear 91, a spindle driven gear 92, a spindle splined sleeve 93, the differential drive shaft 54 and a variable speed differential driven pulley 94.

The main drive shaft 87 is journaled in the main housing 1 by means of preferably ball bearings 95, 96, and 97 in direct axial alignment with the nut drive shaft 62, as shown in Fig. 2. The end cover 98 of the main housing 1 is preferably formed separately from the remainder of the main housing 1 and the bearing sleeves 99, 100, and 101 are formed longitudinally through this top cover 98.

Bearings 95 and 96 are mounted in the bearing sleeve 99 with the lower surface of the bearing 95 abutting an offset 102 at the lower end of the bearing sleeve 99. The lower end of the enlarged diameter portion 103 on the main drive shaft 87 abuts the top surface of the bearings 95 and the upper end of portion 103 abuts the lower suface of the bearing 96. The upper surface of the bearing 96 is abutted by the retaining ring 104 which is partially received in the top end of the bearing sleeve 99.

The retaining ring 104 surrounds the outer diameter of the main drive shaft 87 and has a recess 105 formed therein at its inner diameter. The oil seal 106 is mounted in the recess 105 and prevents any oil from passing through the top cover 98 past the main drive shaft 87.

A bearing ring 107 is partially received over the outer diameter of the retaining ring 104 by preferably a press fit. The bearing 97 is received in the bore of the bearing ring 107 and the lower half 108 of the variable speed differential driving pulley is received in the inner bore of the bearing 97, as shown in Fig. 2. The top half 709 of driving pulley 90 includes a cylindrical portion 110 which telescopes in the inner bore of the lower half 108. The two halves 108 and 109 are fixedly connected by means of a key 111, as shown.

The top half 109 is in turn mounted o nthe main drive shaft 87 and is fixedly connected thereto by means of a key 112. The lower half of the sleeve 110 of the top half 109 abuts the upper edge of an enlarged diameter portion 113 formed on the main drive shaft 87. The motor driven pulley 98 is also received over the main drive shaft 87 spaced above the variable speed pulley 90 and is also fixedly connected to the main drive shaft 87 by means of the key 112.

The lower surface of the bearing 95 is abutted by a spacer ring 114 and the lower surface of the spacer ring 114 abuts the top surface of the spindle driving gear 91 which gear is received over the main drive shaft 87 and fixedly connected thereto by means of the key 115. The lower surface of the spindle driving gear 91 abuts the top surface of the drive cup member 86.

The spindle splined sleeve 93 is mounted surrounding the spline 9 formed in the upper end of the spindle 8 and is held in driving engagement therewith by means of the projections 116. The spline sleeve 93 is journaled in the top cover 98 of the main housing 1 by means of the bearings 117 and 118. Bearings 117 and 118 are received at their outer diameter in the bearing sleeve 100 in the top cover 98 and are held in spaced relation therein by the spacer 119, as shown in Fig. 2.

The lower surface of the bearing 117 abuts the projection 121 formed on the outer diameter of the splined sleeve 93. The lower edge of the projection 121 abuts the top surface of the spindle driven gear 92, which gear 92 is engaged over the outer diameter of the splined sleeve 93 and is affixed thereto in driving connection by means of a key 122.

The gear 92 is mounted in horizontal alignment with the spindle driving gear 91 and the lower surface of the gear 92 is abutted by the lock nut 123, which is preferably threaded on the outer diameter of the splined sleeve 93, as shown in Fig. 2. Thus, the gear 92 is positioned in driving engagement with the spindle driving gear 91 mounted on the main drive shaft 87 and driving connection is obtained thereby between the main drive shaft 87, the spindle driving gear 91, the spindle driven gear 92, the splined sleeve 93 and the spindle 8.

The top surface of the bearing 118 is abutted by the lock nut 124 and the retaining ring 125. The lock nut 124 is preferably threaded over the top end outer diameter of the splined sleeve 93. The retaining ring 125 is received in the bearing sleeve 100, as shown, and extends over and is spaced from the top surface of the lock nut 124 and the splined sleeve 93 thereby surrounding the outer diameter of the spindle 8 near its uppermost end.

The spindle end cover 126 is mounted on the upper surface of the retaining ring 125 and is spaced from but completely covers the upper end of the spindle 8. Sufficient clearance is provided between the spindle end cover 126 and the top of the spindle 8 so that the spindle 8 may move longitudinally upward to its uppermost position, as shown.

The differential drive shaft 54 is journaled in the end cover 98 of the main housing 1 by means of the preferably ball bearings 127 and 128. The bearings 127 and 128 are received in spaced relationship in the bearing sleeve 101. The lower surface of the bearing 127 abuts a projection 129 formed in the bearing sleeve 101 and the top surface of the bearing 127 abuts the lower edge of an enlarged diameter portion 130 formed on the differential drive shaft 54.

The lower surface of the bearing 128 abuts the top edge of the enlarged diameter portion 130 and the upper surface of the bearing 128 is abutted by the retaining ring 131. Retaining ring 131 is received in the upper end of the bearing sleeve 101 and surrounds but is slightly spaced from the differential drive shaft 54. An annular recess 132 is formed at the inner diameter of the retaining ring 131 surrounding the differential drive shaft 54, and the oil seal 133 is received in this recess 132. The oil seal 133 thus prevents any oil from passing through the end cover 98 of the main housing 1 past the differential drive shaft 54.

The variable speed differential driven pulley 94 is received over the upper end of the differential drive shaft 54 and is comprised of a top half 134 and a lower half 135. The lower half 135 of the pulley 94 is mounted on and in driving connection with the differential drive shaft 54, while the upper half 134 is mounted so that it may move away from the lower half 135 with such movement being opposed by a spring force. The pulley 94 is mounted in direct lateral alignment with the variable speed differential driving pulley 90 and driving connection is obtained therebetween by the V-belt 136.

Thus, when it is desired to change the ratio between the pulleys 90 and 94, the two halves 108 and 109 of the pulley 90 are moved in relation to each other so that the V-belt 136 engages the pulley 90 at the desired diameter. Since, the length of the V-belt 136 remains constant, the two halves 134 and 135 of the pulley 94 are forced to move toward or away from each other changing the pitch diameter of the pulley 94 to compensate for the change in pitch diameter of the pulley 90. This change in pitch diameter of the pulley 94 is permitted by the action of the before mentioned spring forcing the upper half 134 against or allowing it to move away from the lower half 135. In this way, the ratio between the pulleys 90 and 94 may be changed, thereby changing the rotational speed of the differential drive shaft 54.

Figures 4, 5:
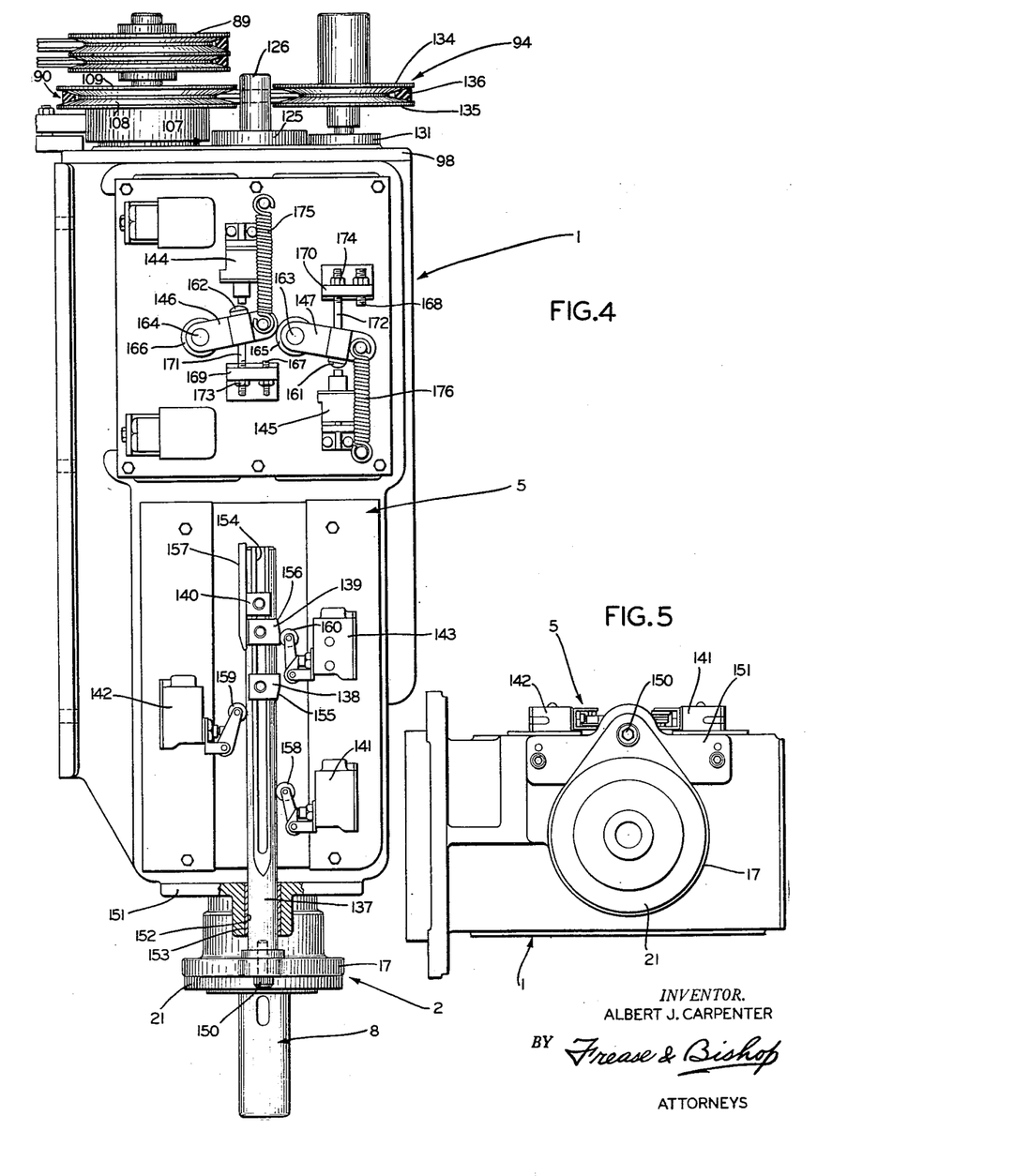
Fig. 4, a side plan view, part in section, of the drill head unit in the "at rest" position.
Fig. 5, a bottom plan view of the drill head unit.

Referring to Fig. 4 the cam and clutch control assembly 5 includes a cam mounting bar 137, a return cam bar 138, a rest cam bar 139, a slow feed cam bar 140, a return switch 141, a slow feed switch 142, a rest switch 143, clutch solenoids 144 and 145, clutch actuating levers 146 and 147 and clutch fork levers 148 and 149 (shown in Fig. 2).

The cam and clutch control assembly 5 is mounted on the outer surface of the main housing 1, as shown, except for the clutch fork levers 148 and 149, which are mounted within the confines of the main housing 1 and serve to connect the cam and clutch control assembly 5 with the clutches 29 and 63.

The cam mounting bar 137 is mounted axially of the spindle 8 and is connected to the quill flange portion 17 and retaining ring 21 by preferably a cap screw 150 which is threaded longitudinally into the lower end of the cam mounting bar 137. A guide member 151 is mounted on the lower lateral surface of the main housing 1 and has formed therein an opening 152. The sleeve bearing 153 is received in the opening 152 and circumferentially surrounds the sides of the cam mounting bar 137. Thus the guide member 151 guides the movement of the cam mounting bar 137 but allows the cam mounting bar 137 to freely reciprocate longitudinally therethrough.

An adjusting slot 154 is formed longitudinally in the cam mounting bar 137 and the return, rest and slow feed cam bars 138, 139 and 140 are adjustably mounted in this slot 154 so that these cam bars may be adjusted to any desired point longitudinally of the cam mounting bar 137. The cam bars 138 and 139 are similar in configuration and include cam surfaces 155 and 156 which extend generally axially of the cam mounting bar 137. The slow feed cam bar 140 includes a cam surface 157 which extends for a greater length longitudinally along the cam mounting bar 137, as shown in Fig. 4, for a purpose to be hereinafter described.

The return, slow feed and rest switches are all similar in design and operation and may be any standard control switch having a cam follower roller. Switches 141, 142 and 143, as shown, are microswitches and have cam following rollers 158, 159 and 160 respectively.

Switches 141, 142 and 143 are mounted to the outside of the main housing 1 adjacent the cam mounting bar 137 so that the cam follower rollers 158, 159 and 160 will either bear against longitudinal sides of the cam mounting bar 137 and roll along these surfaces or will bear against and roll along the cam surfaces 155, 156 and 157 of the cam bars 138, 139 and 140.

Solenoid 143 is mounted to the outer surface of the main housing in alignment with strike button 161 on the clutch actuating lever 147 and solenoid 144 is similarly mounted in direct alignment with a strike button 162 on the clutch actuating lever 146. Solenoids 144 and 145 are of any standard type and are in the extended position when energized.

The clutch actuating levers 146 and 147 are mounted at one end to connecting shafts 163 and 164. These connecting shafts extend through the main housing 1 and are connected to the ends of the clutch fork levers 148 and 149, as shown in Fig. 2. Connecting shafts 163 and 164 are fixedly connected to the clutch actuating levers 146 and 147 and also to the clutch fork levers 148 and 149 and these shafts are journaled in the main housing by means of the bearings 165 and 166 for free rotation therein. Thus, as the solenoids 144 and 145 are energized and bear against the strike buttons 161 and 162, the clutch actuating levers 146 and 147 will rotate the connecting shafts 163 and 164 and thereby rotate the clutch fork levers 148 and 149 around the connecting shafts 163 and 164.

The movement of the levers 146 and 147 away from the solenoids 144 and 145 is limited by the stop pins 167 and 168 which are mounted in the stop plates 169 and 170. The movement of the clutch actuating levers 146 and 147 towards the solenoids 144 and 145 is limited by the stop pins 171 and 172 which are connected to levers 146 and 147 and slidably move through openings in the stop plates 169 and 170. This sliding movement of the stop pins 171 and 172 is restricted by the nuts 173 and 174, as shown in Fig. 4.

Movement of the clutch actuating levers 146 and 147 towards the solenoids 144 and 145, when the solenoids are deenergized, is caused by the springs 175 and 176 which are connected to the levers 146 and 147 at the ends of these levers opposite from their ends that are connected to the shafts 163 and 164. The other ends of the springs 175 and 176 are connected to the main housing 1. Thus, when the solenoids 144 and 145 are energized, forcing the levers 146 and 147 away from these solenoids, the springs 175 and 176 will be extended, and when the solenoids 144 and 145 are deenergized, the springs 175 and 176 force the levers 146 and 147 towards the solenoids.

Clutch fork lever 148 has a clutch follower member 177 mounted in its end opposite its point of connection to the connecting shaft 164 and this follower 177 is engaged in the groove 178 formed in the nut drive shaft clutch member 63. Thus, as the clutch fork lever 148 rotates around the connecting shaft 164, the follower 177 will force the clutch member into either engaged or disengaged position. At the same time the clutch member 63 may rotate with the follower 177 remaining engaged in the groove 178. A similar arrangement provides engagement between the clutch fork lever 149 and the lead screw drive shaft clutch member 29 with the clutch follower 179 being engaged with groove 180 formed in the clutch member 29.

In operation, the spindle and quill assembly 2 starts from "at rest" position and moves longitudinally downward at a predetermined uniform fast rate of movement during the "fast feed" cycle. As the spindle and quill assembly 2 approaches the workpiece to be drilled, the rate of feed downwardly is reduced during the "slow feed" stroke. As the end of the "slow feed" stroke is reached, the spindle and quill assembly 2 returns longitudinally upwardly at a fast rate during the "return stroke."

The spindle 8 is at all times rotated at a constant rotational speed including the time when the spindle and quill assembly 2 are in the "at rest" position. The motor driven pulley 89 is rotated by the driving motor (not shown) which in turn rotates the main drive shaft 87. The main drive shaft 87 rotates the spindle driving gears 91 which in turn rotates the spindle driven gear 92 and thus the splined sleeve 93.

As the splined sleeve 93 is rotated, it in turn rotates the spindle 8 through the projections 116 which are engaged in the spline 9. This engagement between the projections 116 and the spline 9 may be maintained at all times despite longitudinal position of the spindle 8, since the projections 116 may slide longitudinally upwardly and downwardly in the spline 9 and still maintain rotational motion between the spline sleeve 93 and the spindle 8.

During the "at rest" position, the solenoid 144 is deenergized so that the clutch member 63 is in the position shown in Fig. 2 with its upper end 84 disengaged from the drive cup member 86 and with its lower end 83 engaged in the brake cup member 78. This maintains the nut drive shaft 62, the nut driving gear 61, the nut driven gear 60, and the nut 59 against rotation.

Also, the solenoid 145 is deenergized and consequently the clutch member 29 is also in the position shown in Fig. 2. Although the main drive shaft 87 is driving the differential driving pulley 90, which in turn is driving the differential driven pulley 94 through the V-belt 136, and thereby the differential drive shaft 54 is being rotated, since the clutch member 29 is in the disengaged position the lead screw drive shaft is maintained stationary. The upper end 58 of the clutch member 29 is disengaged from the drive cup member 53 and the lower end 57 is engaged in the brake cup member 51, thus, retaining the lead screw drive shaft 28, the differential driving gear 27, the lead screw driven gear 26 and the lead screw 20 against rotation.

Therefore, during the "at rest" position, the spindle 8 is rotating in the quill 7 and also in the lead screw 20. At the same time, the lead screw 20 is retained against rotational motion by the clutch member 29 and the nut 59 is retained against rotational motion by the clutch member 63. The positions of the switches 141, 142 and 143, the cam mounting bar 137 and consequently the cam bars 138, 139 and 140 are those shown in Fig. 4.

The "fast feed" stroke is started by actuating a starting or control switch (not shown) by means of a pushbutton or if on automatic cycle by a relay or limit switch. This switch actuates the solenoid 145 which rotates the clutch actuating lever 147 and therefore the clutch fork lever 149, moving the clutch member 29 to its engaged position. In this position the upper end 58 of the clutch member 29 is engaged with the drive cup member 53 and the lower end 57 is disengaged from the brake cup member 51. Since the differential drive shaft 54 is being constantly rotated, this rotates the lead screw drive shaft 28 rotating the differential driving gear 27, the lead screw driven gear 26, and the lead screw 20.

Also, since, as before described, as the lead screw 20 moves longitudinally upwardly and downwardly, the quill 7 and the spindle 8 must also move upwardly or downwardly. Thus, as the lead screw 20 is rotated in a direction causing it to thread downwardly through the nut 59, it moves the quill 7 and the spindle 8 downwardly. This comprises the "fast feed" stroke and the rate of feed is determined by the speed of rotation of the lead screw 20 and consequently the differential drive shaft 54 and the lead screw drive shaft 28.

This rotational speed of the lead screw 20 may be at any rate despite the rotational speed of the spindle 8, since the lead screw 20 is freely rotatable on the spindle 8. Also the drive to the lead screw 20 is maintained despite the position of the spindle 8, since the driven gear 26 may slide longitudinally in reference to the differential driving gear 27 and still maintain engagement with the differential driving gear 27.

This longitudinal movement between the gears 26 and 27 with a continued driving connection therebetween is permitted by the greater width of the differential driving gear 27 as compared to the width of the driven gear 26. Although the gear 27 remains longitudinally stationary, the gear 26 may move a limited distance longitudinally while still maintaining driving engagement with the gear 27. Thus, the spindle and quill assembly 2 is permitted to move longitudinally for the feed strokes.

The lead screw 20 continues to thread through the stationary nut 59 and move the spindle and quill assembly 2 longitudinally downwardly at the fast feed rate until a predetermined point is reached. At this point, the solenoid 144 is energized forcing the clutch actuating lever 146 to rotate, which in turn causes the clutch fork lever 148 to rotate and engage the clutch member 63.

When the clutch member 63 is engaged, the lower end 83 is disengaged from the brake cup member 78 and the upper end 84 is engaged with the drive cup member 86. Since the drive shaft 87 is constantly rotated, rotational motion is transmitted to the nut drive shaft 62 through the clutch member 63. Rotation of the nut drive shaft 62 rotates the nut driving gear 61, the nut driven gear 60 and consequently the nut 59.

The nut 59 rotates in the same direction as the lead screw 20 but at a lower rate of rotational speed. The difference between the rotational speed of the lead screw 20 and the rotational speed of the nut 59 determines the rate at which the spindle 20 continues to thread through the nut 59.

With the nut 59 rotating, the screw 20 will move longitudinally downward at a lower rate and thus the spindle and quill assembly 2 will move longitudinally downward at a slower rate. This constitutes the "slow feed" cycle, and it is during this cycle that the actual drilling operation on the workpiece takes place.

As the end of the "slow feed" stroke is reached and thus the workpiece has been drilled to the desired depth, the solenoid 145 is deenergized. When this deenergization of the solenoid 145 takes place, the spring force of the spring 176 forces the clutch actuating lever 147 to rotate towards the solenoid 145. This in turn rotates the clutch fork lever 149 which in turn disengages the clutch member 29.

When the clutch member 29 is disengaged the upper end 58 is disengaged from the drive cup member 53 and the lower end 57 is engaged with the brake cup member 51. This engagement with the brake cup member 51 maintains the lead screw drive shaft 28, the differential drive gear 27 and the lead screw driven gear 26 once again against rotation and thus maintains the lead screw 20 against rotation. Since the nut 59 continues to rotate in the bearing 67 the lead screw 20 will be threaded through the nut 59 in the reverse direction or longitudinally upwardly. This forces the spindle and quill assembly 2 longitudinally upwardly and begins the "return" stroke.

This longitudinal upward movement of the spindle and quill assembly 2 for the "return" stroke is continued until the spindle and quill assembly 2 has again reached the point of "at rest" position. At this point, the solenoid 144 is deenergized and the spring 175 forces the clutch actuating lever 146 to rotate toward the solenoid 144. This rotates the clutch fork lever 148 which in turn disengages the clutch member 63.

As before described, when the clutch member 63 is disengaged, the upper end 84 is disengaged from the drive cup member 86 and the lower end 83 is engaged with the brake cup member 78. This engagement of the lower end 83 with the brake cup member 78 again maintains the nut drive shaft 62, nut driving gear 61, nut driven gear 60 and the nut 59 against rotation. Also, as before described, at the "at rest" position, the main drive shaft 87 continues to rotate rotating the spindle driving gear 91, spindle driven gear 92, spindle splined sleeve 93 and consequently the spindle 8.

Figure 6:
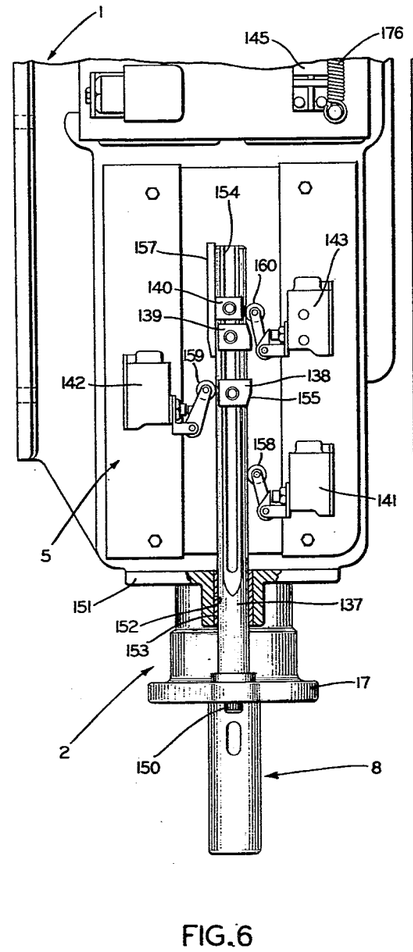
Fig. 6, a fragmentary side plan view, part in section, of the drill head unit during the "fast feed" cycle.
Figure 7:
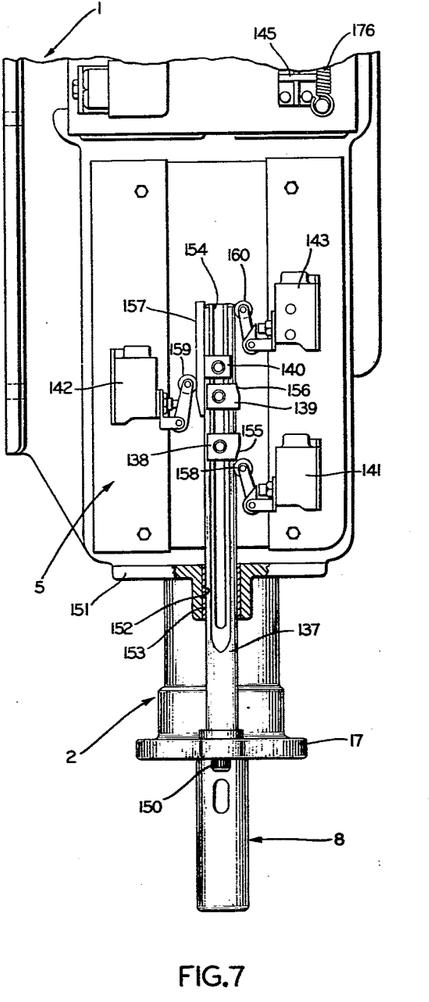
Fig. 7, a fragmentary side plan view, part in section, of the drill head unit during the "slow feed" cycle.

Since the cam mounting bar 137 is rigidly attached to the spindle 8 as before described, as the spindle and quill assembly 2 move longitudinally upwardly and downwardly, the cam mounting bar 137 moves upwardly and downwardly through the guide member 151. During this longitudinal movement, the various cam bars 138, 139 and 140 are brought into engagement with the various switches 141, 142 and 143. The positions of the cam mounting bar 137 during these various strokes are shown in Figs. 4, 6 and 7.

As before mentioned, the solenoid 145 is energized at the start of the "fast feed" stroke by means of a pushbutton for a manual operation or a relay or limit switch if automatic cycling is used. The solenoid 145 remains energized until the return switch 141 is actuated, which actuation deenergizes the solenoid 145. The solenoid 144 is energized by actuation of the slow feed switch 142 and remains energized until deenergization is caused by actuation of the rest switch 143.

Thus, during the "at rest" position, as shown in Fig. 4, the cam roller 160 is engaged with the cam surface 156 of the cam bar 139 so that the rest switch 143 is actuated. The cam rollers 158 and 159 are merely resting against the sides of the cam mounting bar 137 and the switches 141 and 142 are not actuated.

The "fast feed" stroke is started by the pushbutton, relay or limit switch and the cam mounting bar 137 starts its longitudinal downward movement. During this "fast feed" stroke, all of the cam rollers 158, 159 and 160 are rolling along the longitudinal sides of the cam mounting bar 137, as shown in Fig. 6. Also the switches 141, 142 and 143 are not actuated, but the solenoid 145 is energized.

During the "slow feed" stroke, the cam rollers 158, 159 and 160 and the switches 141, 142 and 143 are in the positions shown in Fig. 7. The cam rollers 158 and 160 are still rolling along the longitudinal sides of the cam mounting bar 137 and thus the switches 141 and 143 are not actuated. The cam roller 159 has, however, engaged the cam surface 157 of the cam bar 140 so that the "slow feed" switch 142 has been actuated which has caused energization of the solenoid 144.

As the end of the "slow feed' stroke is reached, the cam roller 158 engages the cam surface 155 on the cam bar 138. This actuates the return switch 141 which de-energizes the solenoid 145, thus starting the "return" stroke. At the latter part of the "return" stroke, the cam rollers 158, 159 and 160 and the switches 141, 142 and 143 again are in the positions shown in Fig. 6.

When the end of the "return" stroke is reached and the spindle and quill assembly 2 has moved longitudinally upwardly to its fully retracted position, the cam surface 156 on the cam bar 139 engages the cam roller 160. This actuates the "rest" switch 143 which deenergizes the solenoid 144. Thus, the spindle and quill assembly 2 is again in its "at rest" position and the cam rollers 158, 159 and 160 and switches 141, 142 and 143 are again in the positions shown in Fig. 4.

If it is desired to change the rate of feed of the spindle 8 for the "slow feed" stroke, this may be done by changing the pitch diameters and thus the ratio between the variable speed differential drive pulley 90 and the variable speed differential driven pulley 94 as before described. This will change the rotational speed of the differential drive shaft 54 and consequently the rotational speed of the lead screw 20. This changes the difference in rotational speed between the lead screw 20 and the nut 59 during this "slow feed" stroke and thereby changes the speed at which the lead screw 20 threads downwardly longitudinally through the nut 59.

It may be noted that a slight change in the rotational speed of the lead screw 20 will greatly vary the rate of feed of the spindle and quill assembly 2 during this "slow feed" stroke. Thus, the "slow feed" stroke speed may be quickly and conveniently varied to compensate for differences in tool construction and various types and hardnesses of material on which the drilling operations are to be performed.

If it is desired to change the lengths of the "fast feed" and "slow feed" strokes, this may also be done very quickly and conveniently. It may be done by merely changing the position of the cam bar 140 in the slot 154 of the cam mounting bar 137 thereby causing the cam roller 159 to engage the cam surface 157 at an earlier or later point in the feed stroke. The points at which the "slow feed" stroke and "at rest" position take place may also be varied simply by changing the positions of the cam bars 138 and 139.

Although the drill head spindle drive construction comprising the present invention has been described and shown in the drawings in the vertical position, that is, so that the spindle and quill assembly 2 moves vertically downwardly and upwardly during the drilling cycle, the drill head spindle drive construction shown and described may be mounted in any position, that is, vertical, horizontal or any position therebetween.

During operation, the main housing 1 is filled with oil so that the various gears and bearings are constantly lubricated. If the drill head is mounted in a horizontal position, it is only necessary to use an oil well to maintain lubrication, but if it is mounted in the vertical position as shown in the drawings an oil pump must be used to maintain the proper lubrication.

Thus the present invention provides a drill head spindle drive construction in which the rate of feed may be quickly and easily adjusted for various materials and various tools; in which the rates of feed remain constant and uniform once set; in which the rates of feed may be quickly and conveniently varied without the necessity of changing gears or cams; which does not require a warm up period in order to obtain constant feed rates; in which the drill head housing remains stationary and a quill directly housing the drill spindle is fed towards and away from the workpiece; in which the feed screw and nut are mounted directly around the drill spindle with one being driven from either side giving a balanced drive for the feed strokes to the quill and spindle; and in which there is no close timing required in order to attain the fast approach stroke, slow feed stroke, and the fast return stroke of the quill and spindle.

In the foregoing description, certain terms have been used for brevity, clearness, and understanding but no unnecessary limitations are to be implied therefrom, because such words are used for descriptive purposes herein and are intended to be broadly construed.

Moreover, the embodiment of the improved construction illustrated and described herein is by way of example and the scope of the present invention is not limited to the exact details of construction shown.

Having now described the invention, the construction, operation and use of a preferred embodiment thereof, and the advantageous new and useful results obtained thereby, the new and useful construction and reasonable mechanical equivalents thereof obvious to those skilled in the art are set forth in the appended claims.

I claim:

1. Drill head spindle drive construction including a constantly rotatable spindle, a first threaded member rotatably mounted on the spindle, a second threaded member rotatably mounted engaged with the first threaded member, means securing the spindle and the first threaded member against longitudinal movement in relation to each other, means constantly driving the spindle, and means including coupling means for independently and selectively driving each of the first and second threaded members.

2. Drill head spindle drive construction including a constantly rotatable spindle, a screw rotatably mounted on the spindle, a nut rotatably mounted surrounding and engaged with the screw, means securing the spindle and the screw against longitudinal movement in relation to each other, means driving the spindle, first clutch means connected to said spindle drive means and selectively driving the screw, and second clutch means connected to said spindle drive means and selectively driving the nut.

3. Drill head spindle drive construction including a constantly rotatable spindle, a screw rotatably mounted on the spindle, a nut rotatably mounted surrounding and engaged with the screw, means securing the spindle and the screw against longitudinal movement in relation to each other, means constantly driving the spindle, first clutch means mounted adjacent one side of the spindle connected to said spindle drive means and selectively driving the screw, and second clutch means mounted adjacent a side of the spindle opposite from the side of said first clutch means, said second clutch means connected to said spindle drive means and selectively driving the nut.

4. Drill head spindle drive construction including a longitudinally reciprocable quill, a constantly rotatable spindle journalled in the quill, a screw rotatably mounted on the spindle, a nut rotatably mounted surrounding and engaged with the screw, means securing the quill, spindle and screw against longitudinal movement in relation to each other, and means constantly driving the spindle and selectively driving the screw and nut.

5. Drill head spindle drive construction including a longitudinally reciprocable quill, a constantly rotatable spindle journalled in the quill, a screw rotatably mounted on the spindle, a nut rotatably mounted surrounding and engaged with the screw, means securing the quill, spindle and screw against longitudinal movement in relation to each other, means constantly driving the spindle, first clutch means connected to said spindle drive means and selectively driving the screw, and second clutch means connected to said spindle drive means and selectively driving the nut.

6. Drill head spindle drive construction including a constantly rotatable spindle, a screw having threads formed thereon rotatably mounted on the spindle, a nut rotatably mounted surrounding the screw and having internal threads formed therein, said screw threads engaged with said internal nut threads for longitudinal movement of the screw in relation to the nut upon relative rotation of the screw and nut, means securing the nut against longitudinal movement, means securing the spindle and the screw against longitudinal movement in relation to each other, and means constantly driving the spindle and selectively driving the screw and nut.

7. Drill head spindle drive construction including a longitudinally reciprocal quill, a constantly rotatable spindle journalled in the quill, a screw having threads formed thereon rotatably mounted on the spindle, a nut rotatably mounted surrounding the screw and having internal threads formed therein, said screw threads engaged with said internal nut threads for longitudinal movement of the screw in relation to the nut upon relative rotation of the screw and nut, means securing the quill, spindle and screw against longitudinal movement in relation to each other, means constantly driving the spindle, first clutch means connected to said spindle drive means and selectively driving the screw, and second clutch means connected to said spindle drive means and selectively driving the nut.

8. Drill head spindle drive construction including a constantly rotatable spindle, said spindle having a spline formed in its outer annular periphery, a splined sleeve rotatably mounted surrounding the spindle and engaged with said spindle spline, a screw rotatably mounted on the spindle, a nut rotatably mounted surrounding and engaged with the screw, means securing the spindle and screw against longitudinal movement in relation to each other, and means constantly driving the spindle spline sleeve and selectively driving the screw and nut.

9. Drill head spindle drive construction including a constantly rotatable spindle, a screw rotatably mounted on the spindle, a screw driven gear affixed to the screw, a nut rotatably mounted surrounding and engaged with the screw, a nut driven gear affixed to the nut, a screw driving gear engaged with the screw driven gear having a width greater than said screw driven gear, a nut driving gear engaged with the nut driven gear, means securing the spindle and screw against longitudinal movement in relation to each other, means driving the spindle, first clutch means connected to said spindle drive means and selectively driving the screw driving gear, and second clutch means connected to said spindle drive means and selectively driving the nut driving gear.

10. Drill head spindle drive construction including a longitudinally reciprocal quill, a constantly rotatable spindle journalled in the quill, a screw rotatably mounted on the spindle, a screw driven gear affixed to the screw, a nut rotatably mounted surrounding and engaged with the screw, a nut driven gear affixed to the nut, a screw driving gear engaged with the screw driven gear having a width greater than said screw driven gear, a nut driving gear engaged with the nut driven gear, means securing the quill, spindle and screw against longitudinal movement in relation to each other, means constantly driving the spindle, first clutch means connected to said spindle drive means and selectively driving the screw driving gear, and second clutch means connected to said spindle drive means and selectively driving the nut driving gear.

11. Drill head spindle drive construction including a constantly rotatable spindle, said spindle having a spline formed in its outer annular periphery, a splined sleeve rotatably mounted surrounding the spindle and engaged with said spindle spline, a screw rotatably mounted on the spindle, a screw driven gear affixed to the screw, a nut rotatably mounted surrounding and engaged with the screw, a nut driven gear affixed to the nut, a screw driving gear engaged with the screw driven gear having a width greater than said screw driven gear, a nut driving gear engaged with the nut driven gear, means securing the spindle and screw against longitudinal movement in relation to each other, means constantly driving the spindle splined sleeve, first clutch means connected to said spindle splined sleeve drive means and selectively driving the screw driving gear, and second clutch means connected to said spindle splined sleeve drive means and selectively driving the nut driving gear.

12. Drill head spindle drive construction including a longitudinally reciprocal quill, a constantly rotatable spindle journalled in the quill, said quill having a spline formed in its outer annular periphery, a splined sleeve rotatably mounted surrounding the spindle and engaged with said spindle spline, a screw rotatably mounted on the spindle, a screw driven gear affixed to the screw, a nut rotatably mounted surrounding and engaged with the screw, a nut driven gear affixed to the nut, a screw driving gear engaged with the screw driven gear and having a width greater than said screw driven gear, a nut driving gear engaged with the nut driven gear, means securing the quill, spindle and screw against longitudinal movement in relation to each other, means constantly driving the spindle splined sleeve, first clutch means connected to said spindle splined sleeve drive means and selectively driving the screw driving gear, and second clutch means connected to said spindle splined sleeve drive means and selectively driving the screw driving gear, and second clutch means connected to said spindle splined sleeve drive means and selectively driving the nut driving gear.

13. Drill head spindle drive construction including a constantly rotatable spindle, a screw rotatably mounted on the spindle, a screw driven gear affixed to the screw, a nut rotatably mounted surrounding and engaged with the screw, a nut driven gear affixed to the nut, a screw drive shaft rotatably mounted adjacent one side and parallel to the spindle, a screw driving gear affixed to the screw drive shaft engaged with the screw driven gear and having a width greater than said screw driven gear, a nut drive shaft rotatably mounted adjacent a side of the spindle opposite said one side and parallel to the spindle, a nut driving gear affixed to the nut drive shaft engaged with the nut driven gear, means securing the spindle and the screw against longitudinal movement in relation to each other, means driving the spindle, first clutch means connected to said spindle drive means and the screw drive shaft selectively driving the screw drive shaft, and second clutch means connected to said spindle drive means and said nut drive shaft selectively driving the nut drive shaft.

14. Drill head spindle drive construction including a constantly rotatable spindle, said spindle having a spline formed in its outer annular periphery, a splined sleeve rotatably mounted surrounding a spindle and engaged with said spline, a screw rotatably mounted on the spindle, a screw driven gear affixed to the screw, a nut rotatably mounted surrounding and engaged with the screw, a nut driven gear affixed to the nut, a screw drive shaft rotatably mounted adjacent and parallel to one side of the spindle, a screw driving gear affixed to the screw drive shaft engaged with the screw driven gear having a width greater than said screw driven gear, a nut drive shaft rotatably mounted adjacent the side of the spindle opposite said one side, a nut driving gear affixed to the nut drive shaft engaged with the nut driven gear, means securing the spindle and screw against longitudinal movement in relation to each other, a main drive shaft, means constantly driving the main drive shaft, means connecting the main drive shaft with the spindle splined sleeve transmitting rotational motion therebetween, a differential drive shaft rotatably mounted adjacent said one side of the spindle and parallel to the spindle, said differential drive shaft being axially aligned with the screw drive shaft, means connecting the main drive shaft with the differential drive shaft transmitting rotational motion therebetween, first clutch means connected to the differential drive shaft and to the screw drive shaft selectively driving the screw driving shaft, and second clutch means connected to the main drive shaft and to the nut drive shaft selectively driving the nut drive shaft.

15. Drill head spindle drive construction including a longitudinal reciprocal quill, a constantly rotatable spindle journalled in the quill, said quill having a spline formed in its outer annular periphery, a splined sleeve rotatably mounted surrounding the spindle and engaged with said spindle spline, a rotatably mounted drive shaft, means constantly driving the main drive shaft, means connecting the main drive shaft and the spindle splined sleeve transmitting rotational motion therebetween, a screw rotatably mounted on the spindle, a screw driven gear affixed to the screw, a nut rotatably mounted surrounding and engaged with the screw, a nut driven gear affixed to the nut, a screw drive shaft rotatably mounted parallel to and adjacent one side of the spindle, a screw driving gear affixed to the screw drive shaft engaged with the screw driven gear and having a width greater than said screw driven gear, a nut drive shaft rotatably mounted parallel to and adjacent the side opposite said one side of the spindle, a nut driving gear affixed to the nut drive shaft engaged with the nut driven gear, means securing the quill spindle and screw against longitudinal movement in relation to each other, a differential drive shaft rotatably mounted parallel to and adjacent said one side of the spindle, said differential drive shaft being in axial alignment with said screw drive shaft, means connecting the main drive shaft and the differential drive shaft transmitting rotational motion therebetween, first clutch means connected to the differential drive shaft and the screw drive shaft selectively driving the screw drive shaft, and second clutch means connected to the main drive shaft and the nut drive shaft and selectively driving the nut drive shaft.

16. Drill head spindle drive construction including a longitudinal reciprocal quill, a constantly rotatable spindle mounted telescoped within the quill, first bearing means engaged with the spindle and quill, a screw rotatably mounted on the spindle, second bearing means engaged with the screw and quill, a nut rotatably mounted surrounding and engaged with the screw, means securing the quill spindle and screw against longitudinal movement in relation to each other, and means constantly driving the spindle and selectively driving the screw and nut.

17. Drill head spindle drive construction including a constantly rotatable spindle, a screw rotatably mounted on the spindle, a nut rotatably mounted surrounding and engaged with the screw, means securing the spindle and the screw against longitudinal movement in relation to each other, means driving the spindle, first clutch means connected to said spindle drive means and selectively driving the screw, said first clutch means including brake means retaining the screw against rotational motion when not driving the screw, second clutch means connected to said spindle drive means and selectively driving the nut, and said second clutch means including brake means retaining the nut against rotational movement when not driving the nut.

18. Drill head spindle drive construction including a constantly rotatable spindle, said spindle having a spline formed in its outer annular periphery, a splined sleeve rotatably mounted surrounding the spindle and engaged with said spline, a screw rotatably mounted on the spindle, a screw driven gear affixed to the screw, a nut rotatably mounted surrounding and engaged with the screw, a nut driven gear affixed to the nut, a screw drive shaft rotatably mounted adjacent and parallel to one side of the spindle, a screw driving gear affixed to the screw drive shaft engaged with the screw driven gear having a width greater than said screw driven gear, a nut drive shaft rotatably mounted adjacent the side of the spindle opposite said one side, a nut driving gear affixed to the nut drive shaft engaged with the nut driven gear, means securing the spindle and screw against longitudinal movement in relation to each other, a main drive shaft, means constantly driving the main drive shaft, means connecting the main drive shaft with the spindle splined sleeve transmitting rotational motion therebetween, a differential drive shaft rotatably mounted adjacent said one side of the spindle and parallel to the spindle, said differential drive shaft being axially aligned with the screw drive shaft, means connecting the main drive shaft with the differential drive shaft transmitting rotational motion therebetween, first clutch means connected to the differential drive shaft and to the screw drive shaft selectively driving the screw drive shaft, said first clutch means including brake means retaining the screw drive shaft against rotational motion when not driving the screw drive shaft, second clutch means connected to the main drive shaft and to the nut drive shaft selectively driving the nut drive shaft, and said second clutch means including brake means retaining the nut drive shaft against rotational motion when not driving the nut drive shaft.

19. Drill head spindle drive construction including a constantly rotatable spindle, a screw rotatably mounted on the spindle, a nut rotatably mounted surrounding and engaged with the screw, means securing the spindle and the screw against longitudinal movement in relation to each other, means driving the spindle, adjustable variable speed means connected to said spindle drive means, first clutch means connected to the variable speed means and selectively driving the screw, and second clutch means connected to said spindle drive means and selectively driving the nut.

20. Drill head spindle drive construction including a constantly rotatable spindle, said spindle having a spline formed in its outer annular periphery, a splined sleeve rotatably mounted surrounding the spindle and engaged with said spline, a screw rotatably mounted on the spindle, a screw driven gear affixed to the screw, a nut rotatably mounted surrounding and engaged with the screw, a nut driven gear affixed to the nut, a screw drive shaft rotatably mounted adjacent and parallel to one side of the spindle, a screw driving gear affixed to the screw drive shaft engaged with the screw driven gear having a width greater than said screw driven gear, a nut drive shaft rotatably mounted adjacent the side of the spindle opposite said one side, a nut driving gear affixed to the nut drive shaft engaged with the nut driven gear, means securing the spindle and screw against longitudinal movement in relation to each other, a main drive shaft, means constantly driving the main drive shaft, means connecting the main drive shaft with the spindle splined sleeve transmitting rotational motion therebetween, a differential drive shaft rotatably mounted adjacent said one side of the spindle and parallel to the spindle, said differential drive shaft being axially aligned with the screw drive shaft, adjustable variable speed means connecting the main drive shaft with the differential drive shaft transmitting rotational motion therebetween, first clutch means connected to the differential drive shaft and to the screw drive shaft selectively driving the screw drive shaft, and second clutch means connected to the main drive shaft and to the nut drive shaft selectively driving the nut drive shaft.

21. Drill head spindle drive construction including a constantly rotatable spindle, a screw rotatably mounted on the spindle, a nut rotatably mounted surrounding and engaged with the screw, means securing the spindle and the screw against longitudinal movement in relation to each other, means driving the spindle, first clutch means connected to said spindle drive means and selectively driving the screw, second clutch means connected to said spindle drive means and selectively driving the nut, and automatic cam control means automatically controlling engagement and disengagement of the first and second clutch means.

22. Drill head spindle drive construction including a constantly rotatable spindle, a screw rotatably mounted on the spindle, a nut rotatably mounted surrounding and engaged with the screw, means securing the spindle and the screw against longitudinal movement in relation to each other, means driving the spindle, adjustable variable speed means connected to said spindle drive means, first clutch means connected to the variable speed means and selectively driving the screw, second clutch means connected to said spindle drive means and selectively driving the nut, and the speed ratio of the variable speed means such that the screw is driven at a greater rotational speed than the nut.

23. Drill head spindle drive construction including a constantly rotatable spindle, a screw rotatably mounted on the spindle, a nut rotatably mounted surrounding and engaged with the screw, means securing the spindle and the screw against longitudinal movement in relation to each other, means driving the spindle, first clutch means connected to said spindle drive means and selectively driving the screw, second clutch means connected to said spindle drive means and selectively driving the nut, a reciprocable cam mounting bar mounted for longitudinal movement with the spindle, control switch means mounted adjacent the cam mounting bar, cam means mounted on the cam mounting bar selectively engaging the control switch means, and clutch control means actuated by the control switch means selectively engaging and disengaging the first and second clutch means.

24. Drill head spindle drive construction including a constantly rotatable spindle, a screw rotatably mounted on the spindle, a nut rotatably mounted surrounding and engaged with the screw, means securing the spindle and the screw against longitudinal movement in relation to each other, means driving the spindle, adjustable variable speed means connected to said spindle drive means, first clutch means connected to the variable speed means and selectively driving the screw, second clutch means connected to said spindle drive means and selectively driving the nut, the speed ratio of the variable speed means such that the screw is driven at a greater rotational speed than the nut, a reciprocable cam mounting bar mounted for longitudinal movement with the spindle and control switch means mounted adjacent the cam mounting bar, cam means mounted on the cam mounting bar selectively engaging the control switch means, and clutch control means actuated by the control switch means selectively engaging and disengaging the first and second clutch means.

25. Drill head spindle drive construction including a longitudinal reciprocable quill, a constantly rotatable spindle journalled in the quill, said spindle having a spline formed in its outer annular periphery, a splined sleeve rotatably mounted surrounding the spindle and engaged with said spindle spline, a rotatably mounted main drive shaft, means constantly driving the main drive shaft, means connecting the main drive shaft and the spindle splined sleeve transmitting rotational motion therebetween, a screw rotatably mounted on the spindle, a screw driven gear affixed to the screw, a nut rotatably mounted surrounding and engaged with the screw, a nut driven gear affixed to the nut, a screw drive shaft rotatably mounted parallel to and adjacent one side of the spindle, a screw driving gear affixed to the screw drive shaft engaged with the screw driven gear and having a width greater than said screw driven gear, a nut drive shaft rotatably mounted parallel to and adjacent the side opposite said one side of the spindle, a nut driving gear affixed to the nut drive shaft engaged with the nut driven gear, means securing the quill and spindle and screw against longitudinal movement in relation to each other, a differential drive shaft rotatably mounted parallel to an adjacent said one side of the spindle, said differential drive shaft being in axial alignment with said screw drive shaft, adjustable variable speed means connected to the main drive shaft and the differential drive shaft transmitting rotational motion therebetween, first clutch means connected to the differential drive shaft and the screw drive shaft selectively driving the screw drive shaft, second clutch means connected to the main drive shaft and the nut drive shaft and selectively driving the nut drive shaft, a reciprocable cam mounting bar connected to the quill and movable longitudinally therewith, control switch means mounted adjacent the cam mounting bar, cam means mounted on the cam mounting bar selectively engaging the control switch means, and clutch control means actuated by the control switch means selectively engaging and disengaging the first and second clutch means.

References Cited in the file of this patent

UNITED STATES PATENTS

| | | |
|---|---|---|
| 174,014 | Sellers | Feb. 22, 1876 |
| 2,502,573 | Lee | Apr. 4, 1950 |
| 2,640,377 | Millholland | June 2, 1953 |
| 2,706,912 | Baker | Apr. 26, 1955 |